Figure 1:
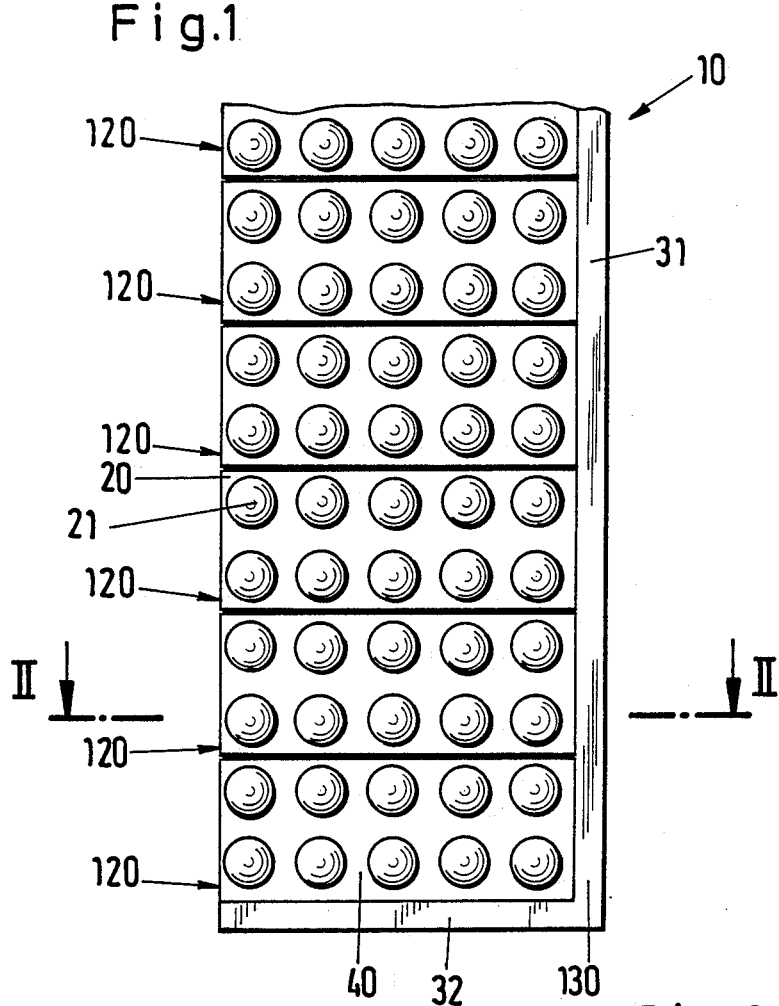

United States Patent [19]

Prignitz

[11] Patent Number: 4,977,711
[45] Date of Patent: Dec. 18, 1990

[54] THERMAL INSULATION MATERIAL AS INSULATING AND SEALING LAYER FOR ROOF AREAS

[76] Inventor: Herbert Prignitz, Papyrusweg 12, D-2000 Hamburg 74, Fed. Rep. of Germany

[21] Appl. No.: 299,834
[22] PCT Filed: Nov. 4, 1988
[86] PCT No.: PCT/EP88/00999
§ 371 Date: Jan. 9, 1989
§ 102(e) Date: Jan. 9, 1989
[87] PCT Pub. No.: WO89/04409
PCT Pub. Date: May 18, 1989

[30] Foreign Application Priority Data

Nov. 5, 1987 [EP] European Pat. Off. ........ 87116268.1

[51] Int. Cl.⁵ .............................................. E04C 1/00
[52] U.S. Cl. ................................. 52/309.8; 52/309.9; 52/309.11; 52/408; 52/792
[58] Field of Search .................... 52/408, 309.7, 309.8, 52/309.9, 309.11, 792, 533, 302, 303; 428/172, 159, 457, 425.8, 262, 319.8

[56] References Cited

U.S. PATENT DOCUMENTS

| | | | |
|---|---|---|---|
| 2,576,073 | 11/1951 | Kropa | 52/309.7 X |
| 3,455,076 | 7/1969 | Clarvoe | 52/302 |
| 3,466,222 | 9/1969 | Curtis | 52/309.8 X |
| 3,496,058 | 2/1970 | Schrotur et al. | 52/309.8 X |
| 3,557,840 | 1/1971 | Maybee | 52/631 X |
| 3,626,044 | 12/1971 | Arnaud | 52/309,7 X |
| 3,969,868 | 7/1976 | Bainter et al. | 52/631 X |
| 3,979,245 | 9/1976 | Bondra | 156/184 |
| 4,361,995 | 12/1982 | Buck et al. | 52/631 X |
| 4,401,706 | 8/1983 | Sovilla | 428/172 X |

FOREIGN PATENT DOCUMENTS

| | | |
|---|---|---|
| 2519484 | 11/1976 | Fed. Rep. of Germany . |
| 3300755 | 3/1984 | Fed. Rep. of Germany . |
| 8519811 | 8/1985 | Fed. Rep. of Germany . |
| 8604889 | 5/1986 | Fed. Rep. of Germany . |
| 8514452 | 9/1986 | Fed. Rep. of Germany . |
| 1103551 | 2/1968 | United Kingdom . |

*Primary Examiner*—David A. Scherbel
*Assistant Examiner*—Linda J. Hoffert

[57] ABSTRACT

In order to provide a thermal insulation material as insulating and sealing layer for roof areas which can be used as sole roofing element for the roof areas, which can be applied on larger areas at a time and in which the disadvantages of the known solution such as the formation of buckling wrinkles and blistering are avoidable, a thermal insulation material is provided as insulating and sealing layer for roof areas which makes it possible to cover larger areas of several square meters at a time, comprising strips of insulation material bonded onto a substrate web, in which case the strips of insulation material (120) are bonded onto a suitable sheet web as a sealing layer (130) in such a way that the thermal insulation material is constructed as insulating and sealing layer so that, when it is laid, it will not be necessary to lay an additional sealing layer.

23 Claims, 1 Drawing Sheet

U.S. Patent

Dec. 18, 1990

4,977,711

THERMAL INSULATION MATERIAL AS INSULATING AND SEALING LAYER FOR ROOF AREAS

The present invention relates to a thermal insulation material as insulating and sealing layer for roof areas which makes it possible to cover larger areas of several square meters at a time, consisting of an underlayer of laminated strips of thermal insulation material.

In the case of flat roofs, especially in the case of roofs not provided with a vapor barrier insulation, it is known to apply the roof sealing in several layers onto the insulation. Manufacturers of insulation material have tried to simplify this multi-layer application in that insulating elements having the normal dimensions of 1.00 m × 0.50 m were provided with a single sealing layer with a projecting overlap on both sides for bonding together with material already laid and consisting of insulating elements that had already been applied. By this measure it was intended to simplify the entire roofing operation and to have the insulating material protected against atmospheric influences immediately after the laying. It was then still necessary to apply the actual sealing layers (at least one) because, due to the application of the elements, overlaps were produced which were too short and there consequently existed a danger of humidity penetrating drom the outside.

Then, for a further simplification and in order to expedite the roofing procedure, web rolls were manufactured comprising an appropriately wide web sealing material having a length of up to 10 meters, onto which the strips of insulation material were bonded, which rendered an unrolling of these webs possible. These web rolls are up to 1 m in width and, having a length of 5 m, they cover a roof area of 5 m² at a time. 5 meters was the stipulated minimum length in order to avoid overlaps which were too short.

These web rolls made it possible for the strips of insulating material to be unrolled so as to form a larger unit for a laying that covered a larger surface area. In this case, normal bitumen roofing felt webs are employed as sealing webs. When being unrolled, however, buckling wrinkles appeared in the substrate web so that there is a risk of leaks in the finished flat roof. That is why several additional roofing webs, but at least one additional roofing web, will have to be applied.

Even nowadays, in the case of flat roofs having a slope of 3% and more, the laying of at least two sealing strips on one thermal insulating layer is still stipulated. If the slope is less than 3% or, in the case of a zero slope, the application of three sealing or welding webs onto the thermal insulating layer is regarded as a job done in a workman-like fashion. Even the plastic sheets, whose development has advanced to such a high degree and which are admitted for use even on roofs having a zero slope, require, as a safety measure on a thermal insulation, an additional underlayer web for protecting the laid-out sheet on the joints of the thermal insulation against damage and the migration of e.g. plasticizers from the sheet sealing. However, the substrate web, irrespective of which type, located on a web roll is recognized as sheet protection. A further significant disadvantage in the multi-layer roof sealing is the dreaded blistering on the flat roof. This is caused by non-bonded points between the sealing layers. The slightest entrapment of humidity when laying the sealing layers on top of one another onto the thermal insulation material leads to non-bonded points and, due to this, invariably to blistering. This blistering is often put down to the vapor pressure apparently produced e.g. by solar radiation.

However, a vapor pressure above atmospheric can only arise at 100° C. and above. But the blistering in the top layers is possible only by the volume increase of the entrapped air at the non-bonded points in accordance with the law of Gay-Lussac. According to this principle, the air volumes behave just like the absolute temperatures. That is why an expansion of the air between the individual sealing layers is unavoidable when the connection between the individual sealing layers, due to appropriate bonding or welding, is not established in such a way that several layers become one and a perfect connection is brought about. This is as good as impossible. It has become better by the use of welding webs, in which case the surfaces of the two joined webs are fused. Thus the blistering can only be avoided if the superposed layers or sealing layers are joined together so as to form one entity.

This is why it is the object of the invention to provide a thermal insulation material as insulating and sealing layer for roof areas which can be employed as sole roofing element for the roof areas, which can be applied onto larger areas at a time, and in which the disadvantages of the known solution, such as the fomation of buckling wrinkles and blistering, are avoidable.

A material of the kind mentioned in the beginning is proposed for solving this technical problem, in which, according to the invention, provision is made for the insulating strips to be bonded onto a suitable sheet web as sealing material, that the thermal insulation material thus produced is constructed as thermal insulating and sealing layer so that, when it is laid, no further sealing layer will have to be applied.

With such a thermal insulation material it is possible to provide a roof area with the requisite thermal insulating and sealing layer in one operation without it being necessary for an additional sealing web having to be applied. A quite decisive saving in labor and material can be achieved on account of this while, at the same time, the quality of the roof covering is increased since, due to the reduction in the activities of the workers, a reduction in the possiblities of errors is achieved.

According to a preferred embodiment, provision has been made in this case for the lining or laminating material to consist of a plastic sheet while, according to another preferred embodiment, the lining or laminating material consists of a metal foil. It is essential in this case that it is ensured by such lining or laminating materials that the thermal insulation is applied onto the roof area in such a way that an appropriate thermal insulation is produced, onto which, at the same time, a sealing layer is applied which can be connected without any difficulty within the overlap areas so that the insulation material, subsequent to the laying operation, is protected against atmospheric factors.

According to another preferred embodiment, the insulation material may consist of a strip of polyurethane, while according to yet another embodiment, polystyrene particle foamed plastic or extruded polystyrene is used as insulation material. This construction of the strips of insulation material as rigid foamed plastic bodies leads to an optimum thermal insulation, by way of preference provision having been made for the insulation material to be produced and/or applied in such a manner that the strips of insulation material, in the laid-out state, are arranged side by side without any gaps.

In this case, provision may be made for the insulation material to be provided with diffusing channels on its surface opposite the lining or lamination. These can be formed in that, on the surface opposing the lining or lamination, projections in regular disposition are provided which possess a spherical, rib-like, frusto-conical or some other geometrical configuration.

In order to increase the inherent stability of the thermal insulation material, particularly for maximum stresses, provision may preferably be made for the insulation material and/or the lining or laminating material to be provided with a stabilization or reinforcement fabric.

Advantageous and expedient embodiments of the invention are characterized in the subclaims.

In the following, an embodiment of the invention is explained with the aid of the drawing.

Figure 2:
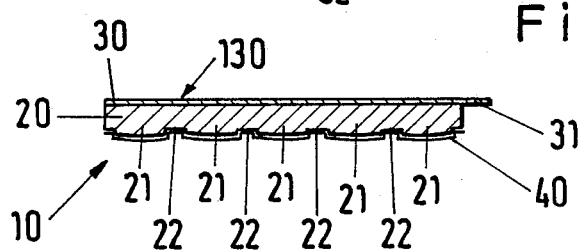

FIG. 1 shows a section of a thermal insulation material in a view from below, and FIG. 2 shows the thermal insulation material in a vertical section in the direction of Line II—II in FIG. 1.

Here, the insulation material is identified with 10, which comprises the sheet or foil web 130 as sealing layer and the strip of thermal insulation material 120 disposed thereupon as insulating material. The sheet web 130, as compared to the strip of thermal insulation material 120, is provided with projecting edges which serve as overlap sections 31, 32 and which are, in each case, arranged on a longitudinal and a transversal edge. In the case of a side-by-side arrangement of the thermal insulation material web (not shown in drawing), appropriate overlap sections 31, 32 can be laid onto the already laid-out insulating webs and be welded onto one another so that a reliable protection against atmospheric influences results.

The strips of insulation material 120 in this case consist of the insulation material 20, for which polyurethane or polystyrene can be chosen. In this connection, spherical projections 21 in regular disposition are provided on the side facing away from the sheet web 130 of the strips of insulating material 120 in order to form diffusing channels 22. These are configured as flat prominences, but any other configuration and arrangement may be provided by means of which it is ensured that, between the roof to be covered (not shown in the drawing) and the thermal insulation material 10, a dehumification zone is produced in which a partial pressure ratio then results which, on account of its relation to the partial pressure ratio of the ambient atmosphere, results in the humidity being drawn off from the surface of the building.

By means of the depicted arrangement, particularly wide and regular steam expansion paths are provided which esnure a reliable dehumification.

The lining or laminating material 30 preferably consists of a plastic sheet or of a metal foil, the strips of insulation material 120 are constructed as polyurethane strips and may also be fabricated from polyestyrene particle foamed plastic or from extruded polystyrene. It is also possible for the strips of insulation material 120 to be fabricated from glass fiber or rock wool strips. Furthermore, the strips of insulation material 120 may be constructed as insulation material 20 bonded on a laminating machine as a strand and subsequently cut insulation material 20. The insulation material 20 is bonded on while cut into strips of insulation material 120. It is likewise possible for the insulation material 20 to be provided with a stabilization fabric.

Worked into the insulation material 20, on the surface opposing the single-layer sealing layer of laminating material 30, are diffusion channels 22. It is also possible for a metal foil 40 to be bonded onto the surface opposite the single-layer sealing layer lamination 30. It is likewise possible to reinforce the material of the sealing layer lamination 30 with the aid of a fabric.

The insulation material 20 is manufactured in panels and, when the strips of insulation material 120 are cut, the panel is not cut right through, as a result of which there still exists a connection of the strips of insulation material 120 for being bonded on in larger areas. The material of the sealing layer lamination 30 is, for a better adhesion of the thermal insulation layer strips, on its surface provided with e.g. a non-woven fabric, or with fabric made from polyester fibers or glass fibers or organic fibers, such as jute or the like.

What is claimed is:

1. An article of insulation positionable between a surface to be covered and an external environment, said article comprising:

a layer of sealing material having a given area defined by a longitudinal and a transverse edge;

an insulation material having a first face facing toward said layer of sealing material and a second face facing oppositely thereof, said insulation material being sized and disposed on said layer of sealing material such that portions of its given area are exposed so as to define at least two overlap sections; and means provided on said insulation material second face for forming diffusion channels on said insulation material second face for drawing off humidity from between said second face and said surface to be covered.

2. An article of insulation as defined in claim 1 further characterized in that the insulation material is comprised of strips of insulation material bonded to said layer of sealing material.

3. An article of insulation as defined in claim 2 further characterized in that said strips of insulation material are formed from polyurethane strips.

4. An article of insulation as defined in claim 2 further characterized in that said strips of insulation material are formed from polystyrene particle formed plastic or extruded polystyrene.

5. An article of insulation as defined in claim 2 further characterized in that said strips of insulation material are formed from glass fiber or rock wool strips.

6. An article of insulation as defined in claim 1 further characterized in that said layer of sealing material is formed from a plastic sheet of weldable material.

7. An article of insulation as defined in claim 2 further characterized in that said layer of sealing material is formed from a plastic sheet of weldable material.

8. An article of insulation as defined in claim 1 further characterized in that said layer of sealing material is formed from a sheet of foil.

9. An article of insulation as defined in claim 2 further characterized in that said layer of sealing material is formed from a sheet of foil.

10. An article of insulation as defined in claim 1 further characterized in that said means for forming diffusing channels in said insulation material includes a plurality of projections in regular disposition on said face facing away from said layer of sealing material.

11. An article of insulation as defined in claim 2 further characterized in that said means for forming said diffusing channels in said insulation material includes a plurality of projections in regular disposition formed on said face of said insulation material strips facing away from said layer of sealing material.

12. An article of insulation as defined in claim 10 further characterized in that each of said projections are configured in vertical section as flat prominences.

13. An article of insulation as defined in claim 11 further characterized in that said plurality of projections are configured as flat prominences.

14. An article of insulation as defined in claim 2 further characterized in that said insulation material is manufactured in panels and said strips are formed by partially cutting said panels such that when said strips of insulation material are cut, said panel is not cut right through.

15. An article of insulation as defined in claim 1 further characterized in that said layer of sealing material is a lamination reinforced by fabric.

16. An article of insulation as defined in claim 10 further characterized in that a sheet of foil is bonded onto said face of said insulation material facing away from said layer of sealing material thereby covering said plurality of projections and externally defining said diffusing channels.

17. An article of insulation as defined in claim 11 further characterized in that a sheet of foil is bonded onto said face of said insulation material strips facing away from said layer of sealing material thereby covering said plurality of projections and externally defining said diffusing channels.

18. An article of insulation as defined in claim 1 further characterized in that said exposed portions of said layer of sealing material given area are oriented respectively along said longitudinal and said transverse edges to define two generally orthogonally oriented overlap sections.

19. An article of insulation as defined in claim 2 further characterized in that said exposed portions of said layer of sealing material given area are oriented respectively along said longitudinal and said transverse edges to define two generally orthogonally oriented overlap sections.

20. An article of insulation as defined in claim 12 further characterized in that said exposed portions of said layer of sealing material given area are oriented respectively along said longitudinal and said transverse edges to define two generally orthogonally oriented overlap sections.

21. An article of insulation as defined in claim 2 further characterized in that said strips of insulation material are constructed as insulation material bonded in a lamination machine as a strand and subsequently cut.

22. An article of insulation as defined in claim 10 further characterized in that said layer of sealing material is a lamination reinforced by fabric and wherein a sheet of foil is bonded onto said face of said insulation material facing away from said layer of sealing material thereby covering said plurality of projections and externally defining said diffusing channels.

23. An article of insulation as defined in claim 10 further characterized in that said layer of sealing material is a lamination reinforced by fabric and wherein a sheet of foil is bonded onto said face of said insulation material facing away from said layer of sealing material thereby covering said plurality of projections and externally defining said diffusing channels.

* * * * *